(12) United States Patent
Yeh

(10) Patent No.: US 7,083,486 B2
(45) Date of Patent: Aug. 1, 2006

(54) LAYERED COMPOSITE MATERIAL

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 0 days.

(21) Appl. No.: 11/018,430

(22) Filed: Dec. 20, 2004

(65) Prior Publication Data

US 2005/0101201 A1 May 12, 2005

Related U.S. Application Data

(63) Continuation-in-part of application No. 10/386,634, filed on Mar. 13, 2003, which is a continuation-in-part of application No. 10/040,404, filed on Jan. 9, 2002, now abandoned.

(51) Int. Cl.
*B63B 1/00* (2006.01)
(52) U.S. Cl. ......................... 441/65; 441/74
(58) Field of Classification Search ................. 441/65, 441/74
See application file for complete search history.

(56) References Cited

U.S. PATENT DOCUMENTS

| | | | |
|---|---|---|---|
| 4,850,913 A | * | 7/1989 | Szabad, Jr. .................. 441/65 |
| 5,211,593 A | * | 5/1993 | Schneider et al. ............ 441/65 |
| 5,647,784 A | * | 7/1997 | Moran ......................... 441/65 |
| 6,358,599 B1 | | 3/2002 | Deibel et al. |

* cited by examiner

*Primary Examiner*—Lars A. Olson
(74) *Attorney, Agent, or Firm*—Rosenberg, Klein & Lee

(57) ABSTRACT

This invention relates to a layered composite material, which comprises a foam skin, a plastic plate and a plastic film. The foam skin has a density in a range of 1.5 to 12 PCF and a thickness in a range of 1 to 6 mm. The plastic plate is laminated to a top surface of the foam skin without adhesives and the plastic plate has a thickness in a range of 0.1 to 2 mm. The plastic film has a surface laminated to a bottom surface of the foam skin without adhesives and the plastic film has a thickness in a range of 0.01 to 0.15 mm. In addition, layered composite material further comprises a fabric layer laminated to other surface of said plastic film without adhesives.

1 Claim, 5 Drawing Sheets

LAYERED COMPOSITE MATERIAL

CROSS REFERENCE TO RELATED APPLICATION

This application is a continuation-in-part application of co-pending U.S. application Ser. No. 10/386,634 filed Mar. 13, 2003, which is a continuation-in-part application of the U.S. application Ser. No. 10/040,404 application filed Jan. 9, 2002, now abandoned.

TECHNICAL FIELD

This invention relates generally to a layered composite material, which is not only provided for manufacturing cases, such as suitcases, luggage, tool cases, musical instrument cases, but also for manufacturing pads, mats, toys, bags and sporting goods etc.

BACKGROUND OF THE INVENTION

For the manufacturers of suitcases, luggage and cases, casing materials with lightweight, strong structure and low cost are in substantial demand. Generally speaking, one conventional casing material for suitcases or luggage is a composite metal, which is strong in structure but heavy in weight, also expensive in cost. Another conventional casing material is a composite plastic material, which is lighter in weight and cheaper in cost but poorer in structure compared with the composite metal. For example, an acrylonitrile butadiene styrene (ABS) material is a popular material for manufacturing suitcases, luggage and so on. The ABS material has a nature of wear-resistance but limited. In addition, the suitcases made of the ABS material are easily deformed and the edges of the suitcases are also easily broken, after the impact between the suitcases during transportation.

SUMMARY OF INVENTION

The primary objective of the present invention is to provide a layered composite material with lightweight, strong structure and low cost. The layered composite material not only is provided for manufacturing various cases, such as suitcases, luggage, tool boxes etc., but also for manufacturing pads, mats, toys, bags, sporting goods and so on.

More specifically, in one embodiment of the present invention, the layered composite material comprises a foam skin, a plastic plate and a plastic film. The foam skin has a density in a range of 1.5 to 12 PCF and a thickness in a range of 1 to 6 mm. The plastic plate is laminated to a top surface of the foam skin without adhesives and the plastic plate has a thickness in a range of 0.1 to 2 mm. The plastic film has a surface laminated to a bottom surface of the foam skin without adhesives and the plastic film has a thickness in a range of 0.01 to 0.15 mm. Moreover, the foam skin, the plastic plate and the plastic film are laminated by thermal fusing processes.

In addition, the layered composite material further comprises a fabric layer laminated to other surface of the plastic film without adhesives and the plastic film is as a bonding film between the foam skin and the fabric layer.

Furthermore, the foam skin in the present invention is made of a foamed plastic material, such as polyethylene foam or polypropylene foam. The plastic plate and the plastic film can be a single film or a composite film with patterns or colors. Therefore, the layered composite material of the present invention has features of strong structure, lightweight, low cost and also variety.

BRIEF DESCRIPTION OF DRAWINGS

The invention will be more clearly understood after referring to the following detailed description read in conjunction with the drawings wherein.

DETAILED DESCRIPTION OF PREFERRED EMBODIMENTS

Figure 1:
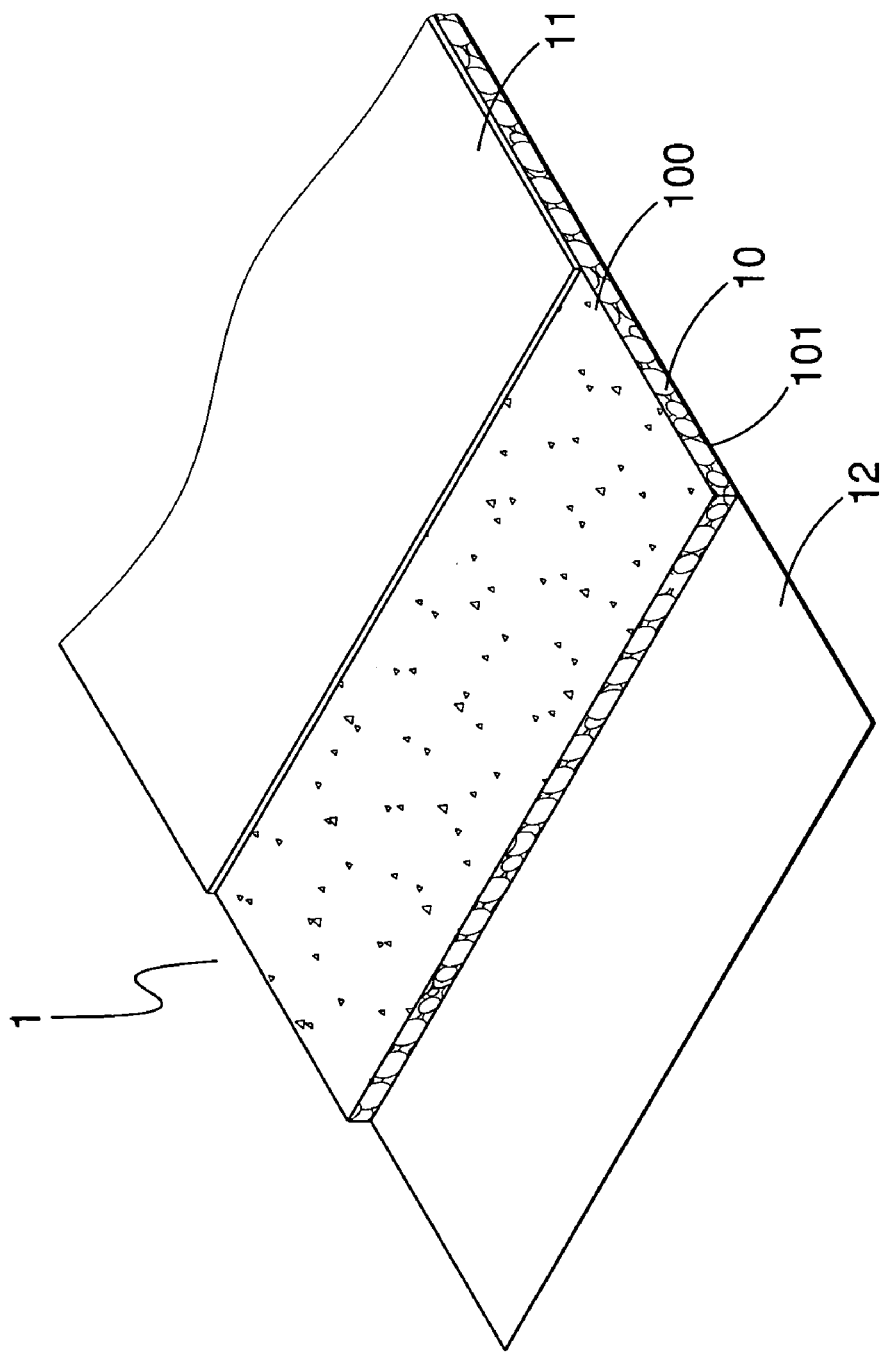
FIG. 1 is a cross sectional view of the first embodiment of the present invention.

A layered composite material 1 according to a first embodiment of the present invention is shown in FIGS. 1 to 4. In FIG. 1, the layered composite material 1 comprises a foam skin 10, a plastic plate 11 and a plastic film 12. The foam skin 10 is preferred made of polyethylene foam skin, which has a preferred density in a range of 1.5 to 12 PCF and a preferred thickness in a range of 1 to 6 mm. The plastic plate 11 is laminated to a top surface 100 of the foam skin 10 without adhesives and the plastic plate 11 is preferred made of polyethylene plate, which has a thickness in a preferred range of 0.1 to 2 mm. Furthermore, the plastic plate 11 in the present invention is preferred made of scratch/wear resistant materials, such as Surlyn® as manufactured by Dupont Corporation and the plastic plate 11 can be a single or a composite plate, according to the varied applications of the present invention.

Figure 2:
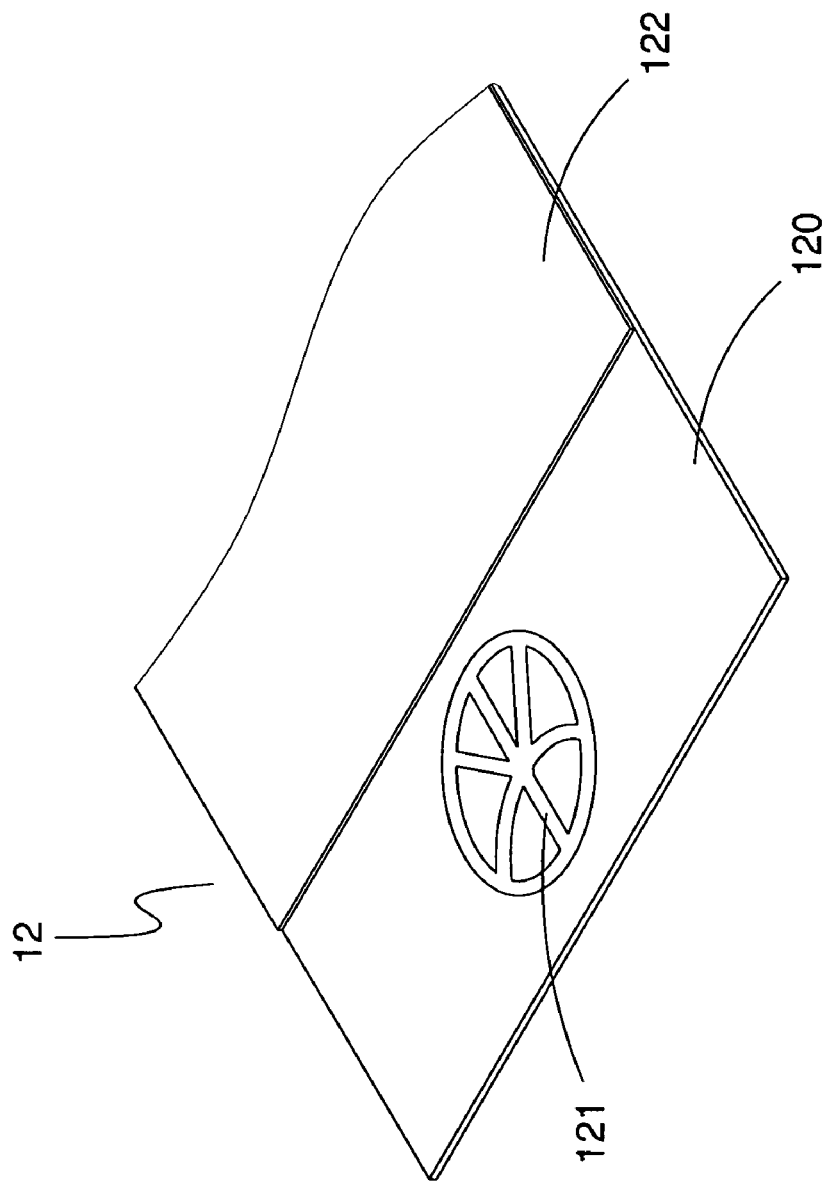
FIG. 2 is a cross sectional view of the first embodiment of the present invention which, showing the plastic film being a composite film with patterns.

The plastic film 12 has a surface laminated to a bottom surface 101 of the foam skin 10 without adhesives and the plastic film 12 is preferred made of polyethylene film, which has a thickness in a preferred range of 0.01 to 0.15 mm. In addition, the plastic film 12 can be a single or a composite film. As shown in FIG. 2, the plastic film 12 is a composite film with patterns and comprises a first film 120 and a second film 122. The first film 120 has a surface formed a pattern 121 thereon and the second film 122 is laminated to the surface of the first film 120 without adhesives, thereby the pattern 121 is covered. Furthermore, the pattern 121 is visible from outside of the plastic film 12. The composite film with patterns, namely the first film 120 and the second film 122 of the plastic film 12 is applicable to the plastic plate 11 as well.

Figure 3:
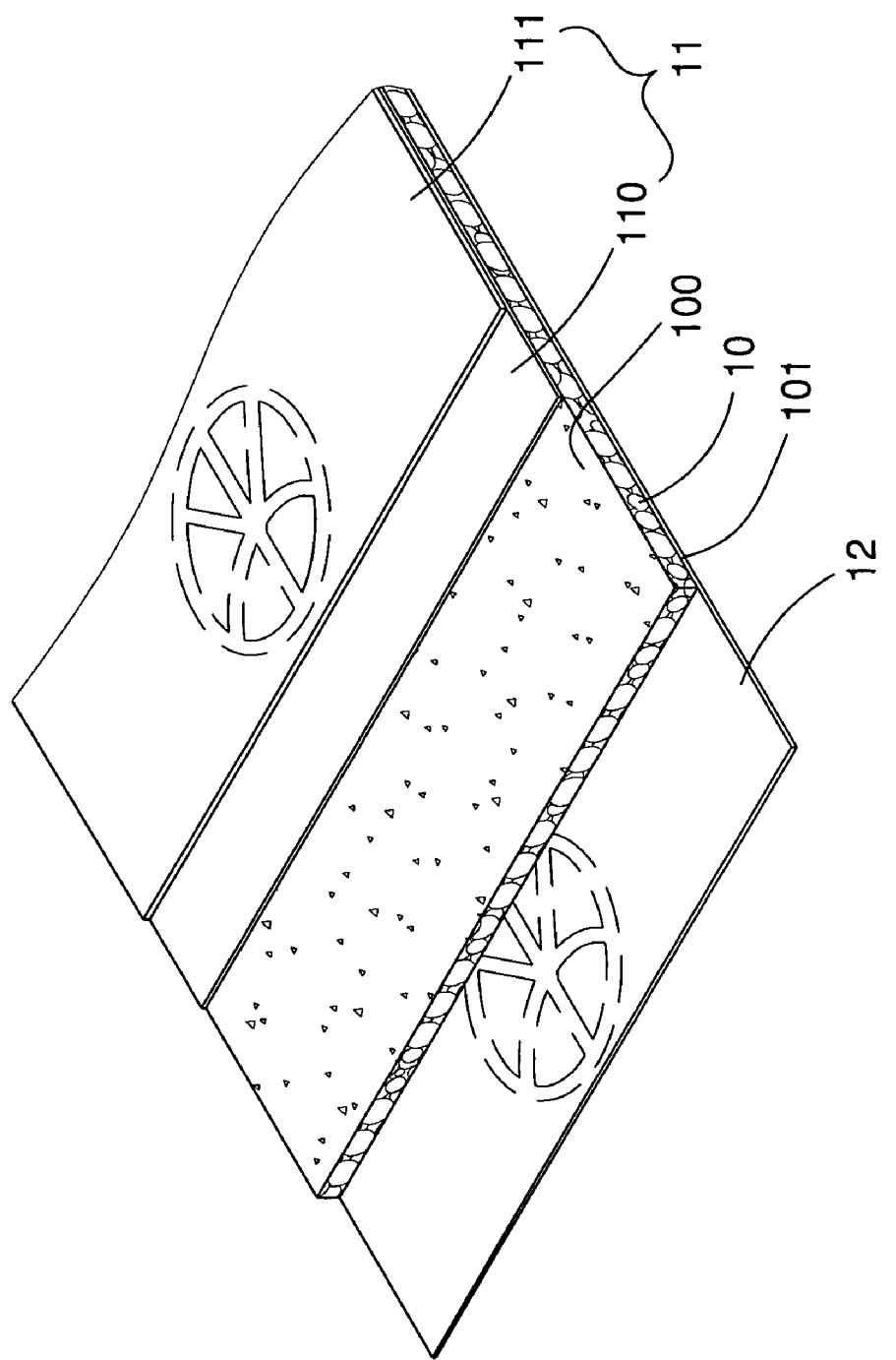
FIG. 3 is a cross sectional view of the first embodiment of the present invention, showing the plastic film and the plastic plate being composite films with patterns.

FIG. 3 shows the plastic film 12 and the plastic plate 11 are composite films with patterns. The plastic plate 11 further comprises a patterned layer 110 and a plastic layer 111. The patterned layer 110 is laminated to the top surface 100 of the foam skin 10 without adhesives and the patterned layer 110 has patterns therein. The plastic layer 111 is laminated to the patterned layer 110 without adhesives and the patterns are visible from outside of the plastic plate 11.

Moreover, the patterned layer 110 is a composite layer, which applies the same structure of the plastic film 12 and comprises a first layer (not shown) and a second layer (not shown). The first layer has the same structure as the first film 120 of the plastic film 12 and the second layer has the same structure as the second film 122 of the plastic film 12, as shown in FIG. 2. Because the structures of the patterned layer 110 applies to the structures of the plastic film 12, a further detailed description of the patterned layer 110 is omitted.

The foam skin 10, the plastic plate 11 and the plastic film 12 of the first embodiment are made of polyethylene materials, so they can be easily and directly to be heat laminated to each other without adhesives.

Figure 4:
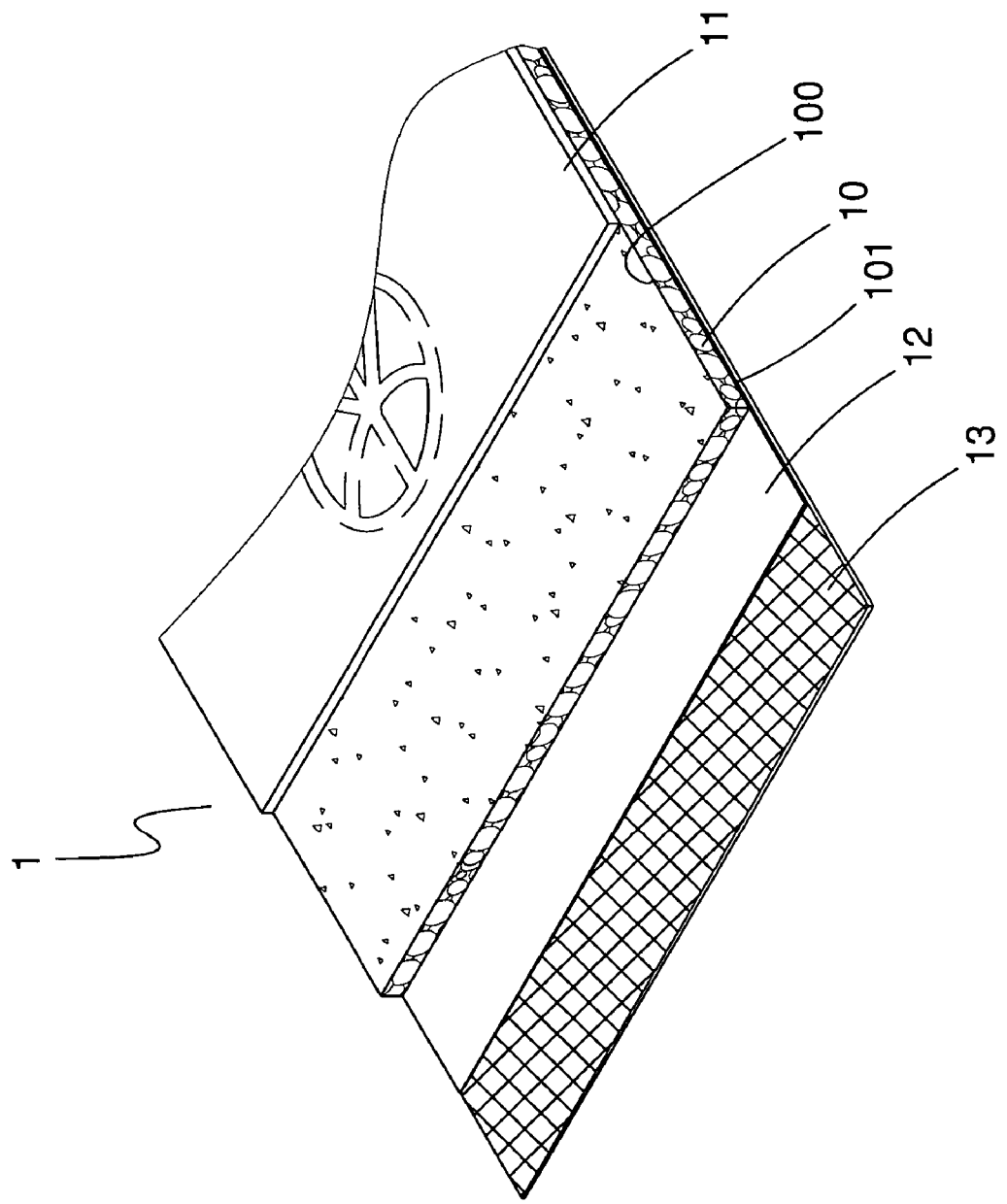
FIG. 4 is a cross sectional view of the first embodiment of the present invention, showing the layered composite material further comprising a fabric layer.

FIG. 4 shows the layered composite material 1 further comprises a fabric layer 13, which is laminated to other surface of the plastic film 12 without adhesives. Furthermore, the plastic film 12 of the first embodiment is also used as a bonding film between the foam skin 10 and the fabric layer 13 that provides for a thermal fusing bonding to the foam skin 10 and a mechanical bonding to the fabric layer 13. The bonding film has a preferred thickness in a range of 0.03 to 0.3 mm. Moreover, the fabric layer 13 of the present invention is made of flexible fabric materials, such as woven, jersey, velour and nylon fabrics.

In addition, a preferable laminating method of the foam skin 10, the plastic plate 11, the plastic film 12, namely the bonding film, and the fabric layer 13 is described as followings. First, the material of the plastic film 12/the bonding film is melted, extruded and directly coated onto the surface of the fabric layer 13. In the meantime, the foam skin 10 is transported to a bonding device for bonding one surface of the foam skin 10 to the fabric layer 13 through the plastic film 12. Second, have the melting plastic plate 11 coated and bonded to the other surface of the foam skin 10 without adhesives. In practice, the lamination and the bonding of foam skin 10, the plastic plat 11 and the plastic film 12 would be various, according to the selected thickness of the plastic plate 11 and the plastic film 12 and/or the single/composite film/layer of the plastic plate 11 and the plastic film 12.

Figure 5:
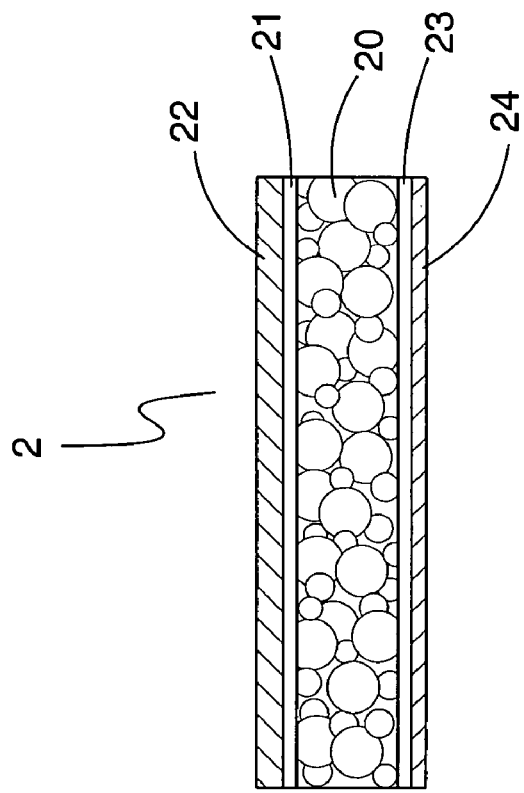
FIG. 5 is a cross sectional view of the second embodiment of the present invention.

A second embodiment of the present invention is shown in FIG. 5. A layered composite material 2 of the second embodiment comprises a foam skin 20, a first bonding film 21, a plastic plate 22, a second bonding film 23 and a plastic film 24. The foam skin 20 is preferred made of polypropylene foam skin, which has a preferred density in a range of 1.5 to 12 PCF and a preferred thickness in a range of 1 to 6 mm. The first bonding film 21 has a surface laminated to a top surface of the foam skin 20 without adhesives and the plastic plate 22 is laminated to other surface of said first bonding film 21 without adhesives. The first bonding film 21 provides for a thermal fusing bonding between the foam skin 20 and the plastic plate 22. Furthermore, the structure and the material of the plastic plate 11 of the first embodiment are also applicable to the plastic plate 22, which is preferred made of scratch/wear resistant materials, such as Surlyn® as manufactured by Dupont Corporation and the plastic plate 22 can be a single or a composite plate with patterns.

In addition, the second bonding film 23 has a surface laminated to a bottom surface of the foam skin 20 without adhesives and the plastic film 24 has a surface laminated to other surface of the second bonding film 23 without adhesives. The second bonding film 23 also provides for a thermal fusing bonding between the foam skin 20 and the plastic film 24. Also, the structure and the material of the plastic film 12 of the first embodiment are applicable to the plastic film 24 of the second embodiment. Furthermore, it is known that polypropylene materials are incompatible with polyethylene materials whiling bonding. Therefore, the foam skin 20 made of polypropylene is difficult to bond to the polyethylene film/plate 22, 24 without adhesives. In the second embodiment of the present invention, the first and second bonding films 21, 23 have the characteristics for bonding the polyethylene plastic plate/film 22, 24 to the polypropylene foam skin 20 so the plastic plate 22 and the plastic film 24 can be bonded to the foam skin 20 without adhesives, after thermal fusing processes.

Figure 6:
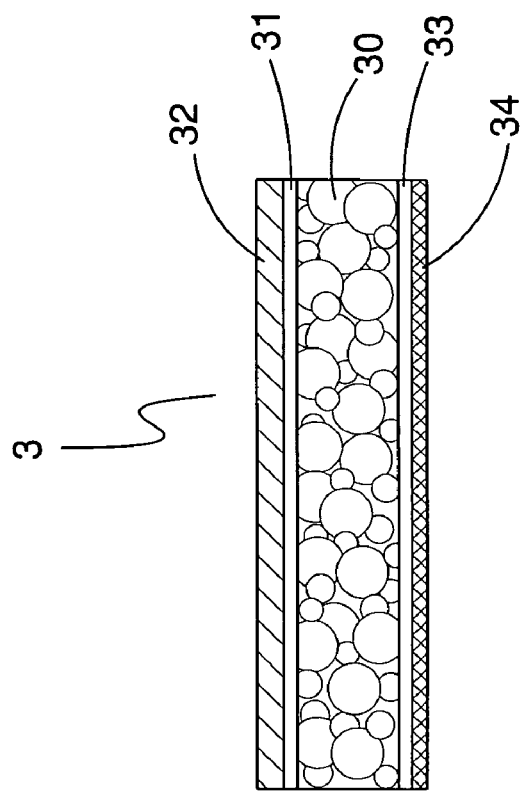
FIG. 6 is a cross sectional view of the third embodiment of the present invention.

FIG. 6 shows a third embodiment of the present invention. A layered composite material 3 of the third embodiment comprises a foam skin 30, a first bonding film 31, a plastic plate 32, a second bonding film 33 and a fabric layer 34. The foam skin 30 is preferred made of polypropylene foam skin, which has a preferred density in a range of 1.5 to 12 PCF and a preferred thickness in a range of 1 to 6 mm. The first bonding film 31 has a surface laminated to a top surface of the foam skin 30 without adhesives and the plastic plate 32 is laminated to other surface of said first bonding film 31 without adhesives. The first bonding film 31 provides for a thermal fusing bonding between the foam skin 30 and the plastic plate 32. Furthermore, the second bonding film 33 has a surface laminated to a bottom surface of the foam skin 30 without adhesives and the fabric layer 34 has a surface laminated to other surface of the second bonding film 33 without adhesives. The second bonding film 33 provides for a thermal fusing bonding to the foam skin 30 and a mechanical bonding to the fabric layer 34.

The structures and the materials of the plastic plate 11 and the fabric layer 13 of the first embodiment are also applicable to the plastic plate 32 and the fabric layer 34 of the third embodiment. The first and second bonding films 31, 33 of the third embodiment also have the characteristics for respectively bonding the polyethylene plastic plate 32 and the fabric layer 34 to the polypropylene foam skin 30 without adhesives, after thermal fusing processes. In addition, the first bonding films 21, 31 of the second and third embodiments are preferred to be extruded and coated to the plastic plate 22, 32 and the second bonding films 23, 33 of the second and third embodiments are preferred to be extruded and coated to the plastic film 24 and fabric layer 34 as well during laminating processes.

According to the above-mentioned embodiments, the layered composite material of the present invention is comprised by a smooth and flexible foam skin, a tough and wear/impact resistant plastic plate and a patterned and colorful plastic film/fabric layer. In addition, the compositions of the layered composite material are flexible, tough, moldable, lightweight and low cost, so that the layered composite material of the present invention can be applied to various fields.

In the applications to the cases and bags, such as suitcases, luggage, tool boxes, musical instrument cases, sporting bags and so on, the layered composite material of the present invention provides a smooth, flexible, lightweight, cushion-like foam skin as a base or a structure, a tough, wear/impact resistant plastic plate as an outer casing, and a patterned, colorful plastic film/fabric layer as a liner. Compared with the conventional cases, the present invention improves their weights, costs, structures, appearances, also values as well.

Furthermore, according to the advantages of the present invention as described above, the layered composite material can further be applied to other fields. For examples, pads such as mouse pads and cup pads, mats such as table mats and sporting mats, sporting goods such as surfing boards, sliders for snow, grass, sand and the like.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extent indicated by the broad general meaning of the terms in which the appended claims are expressed.

I claim:
1. A layered composite material comprising:
a foam skin, having a density in a range of 1.5 to 12 PCF and a thickness in a range of 1 to 6 mm; and
a plastic film, having a surface laminated to a bottom surface of said foam skin and comprising:
a first film, having a surface formed patterns thereon; and
a second film, laminated to said surface of said first film, thereby said patterns are covered, wherein said plastic film having a thickness in a range of 0.01 to 0.15 mm and said patterns are visible from outside of said plastic film.

* * * * *